United States Patent [19]

Tamai et al.

[11] Patent Number: 5,046,992

[45] Date of Patent: Sep. 10, 1991

[54] ROBOT ARM CAPABLE OF THREE-DIMENSIONALLY MOVING A ROBOT ARM MEMBER

[75] Inventors: Tadamoto Tamai, Tokyo; Keiji Okada, Ehime, both of Japan

[73] Assignee: Sumitomo Eaton Nova Corporation, Tokyo, Japan

[21] Appl. No.: 611,524

[22] Filed: Nov. 13, 1990

[30] Foreign Application Priority Data

Nov. 14, 1989 [JP] Japan .................. 1-296330

[51] Int. Cl.⁵ ............................................. F16H 7/00
[52] U.S. Cl. .................................. 474/84; 901/19
[58] Field of Search ............................. 474/84–89, 474/202; 901/8, 14, 17, 25, 19

[56] References Cited

U.S. PATENT DOCUMENTS

| | | | |
|---|---|---|---|
| 837,486 | 12/1906 | Mason | 474/84 |
| 2,611,283 | 9/1952 | Asken et al. | 474/86 X |
| 2,894,325 | 7/1959 | Flatland | 474/88 X |

*Primary Examiner*—Thuy M. Bui
*Attorney, Agent, or Firm*—Burns, Doane, Swecker & Mathis

[57] ABSTRACT

In a robot arm for use in converting rotary motion of a rotatable axle located within a main post into linear motion of a chuck arm, a first arm unit is fixed to the rotatable axle while a first gear is fixed to the main post so that the first gear is rotated relative to the first arm unit with rotation of the rotatable axle. Rotation of the first arm unit is transmitted through a first power transmission element to a second gear which is rotatably supported on a first fixed axle. A second arm unit is fixed to the second gear while a third gear is fixed to the first fixed axle so that the third gear is rotated relative to the second arm unit. Relative rotation of the third gear is transmitted via a second power transmission element to a fourth gear fixed to the chuck arm. A first gear ratio of the first to the second gears and a second gear ratio of the third to the fourth gears are equal to 2:1 and 1:2, respectively, so that the rotary motion of the rotatable axle is converted into the linear motion of the chuck arm. In addition, a distance between the rotatable axis and the first fixed axle is equal to a distance between the firts and the second fixed axles. The main post is accommodated within a housing so that the main post is selectively moved downwards and upwards or is rotated.

6 Claims, 3 Drawing Sheets

ROBOT ARM CAPABLE OF THREE-DIMENSIONALLY MOVING A ROBOT ARM MEMBER

BACKGROUND OF THE INVENTION

This invention relates to a robot arm for use in transporting or manipulating a semiconductor wafer from one station to another one within a processing apparatus for manufacturing a semiconductor device.

A robot arm of the type described has been proposed in Abbe U.S. Pat. No. 4,897,015 and is suitable for manipulating semiconductor wafers. The robot arm comprises an end effector at an end of the robot arm and is operable to convert rotary motion into radial or linear motion of the end effector by driving a single motor. Such conversion of the rotary motion into the radial motion is established by selecting rotation ratios between the end effector and the first arm unit and between the first arm unit and the second arm unit and also by selecting lengths of the first and the second arm units.

In addition, the robot arm proposed by Abbe enables rotation motion and elevation motion depicted at $\theta$ and Z, respectively. To this end, the end effector is pivotally connected to the first arm unit which is in turn pivotally jointed to a second arm unit which defines a reference point. The radial motion of the end effector is carried out under control of the single motor while auxiliary motor drives are also prepared to carry out the rotation and the elevation motions.

However, no disclosure is made in Abbe at all about a practical mechanism for establishing the rotation motion and the elevation motion, because the auxiliary motor drives are illustrated in blocks in Abbe. Accordingly, it is difficult to anticipate the practical mechanism for the rotation and the elevation motions from Abbe.

SUMMARY OF THE INVENTION

It is an object of this invention to provide a robot arm which is capable of selectively carrying out both of linear motion and elevation motion by a simple structure.

It is another object of this invention to provide a robot arm of the type described, which is capable of quickly converting rotary motion into linear motion.

It is still another object of this invention to provide a robot arm of the type described, which is light in weight.

A robot arm according to this invention comprises a main post which has a hollow space therein, an upper end, and a lower end, a rotatable axle which has first and second ends adjacent to the upper and the lower ends of the main post, respectively, and which is extended along the main post within the hollow space, a first motor coupled to the second end of the rotatable axle and adjacent to the lower end of the main post for rotating the rotatable axle, a first gear which has a first predetermined number of teeth and which is fixed to the first end of the main post, a first arm unit which has an inner and an outer end and which is fixed to the inner end of the first axle to be extended from the first end of the first axle, a first fixed axle which is fixed to the outer end of the first arm unit and which stands upright from the outer end of the first arm unit, a second gear which has a second predetermined number of teeth and which is rotatably supported on the first fixed axle, a first power transmission element coupled to the first and the second gears, a second arm unit which has first and second end portions adjacent to and farther from the first arm unit, respectively, and which is fixed to the second gear at the first end portion to be extended from the first end portion, a third gear which has the second predetermined number of teeth and which is fixed to the first fixed axle with the third gear placed within the second arm unit, a second fixed axle which is fixed to the second end portion of the second arm unit and which stands upright from the second end portion of the second arm unit, a fourth gear which has a third predetermined number of teeth and which is rotatably supported on the second fixed axle with the fourth gear located within the second arm unit, a second power transmission element coupled to the third and the fourth gears, a chuck arm which is fixed to the fourth gear and which is extended from the second arm unit, a housing for accommodating the main post along with the first motor, a second motor which has an output axis and which is fixed to an inside wall of the housing, a frame member placed within the housing and connected to the output axis of the second motor for rotating the main post, and an elevating member fixed to the frame member and the main post for selectively moving the main post downwards and upwards.

DESCRIPTION OF THE PREFERRED EMBODIMENTS

Figure 1:
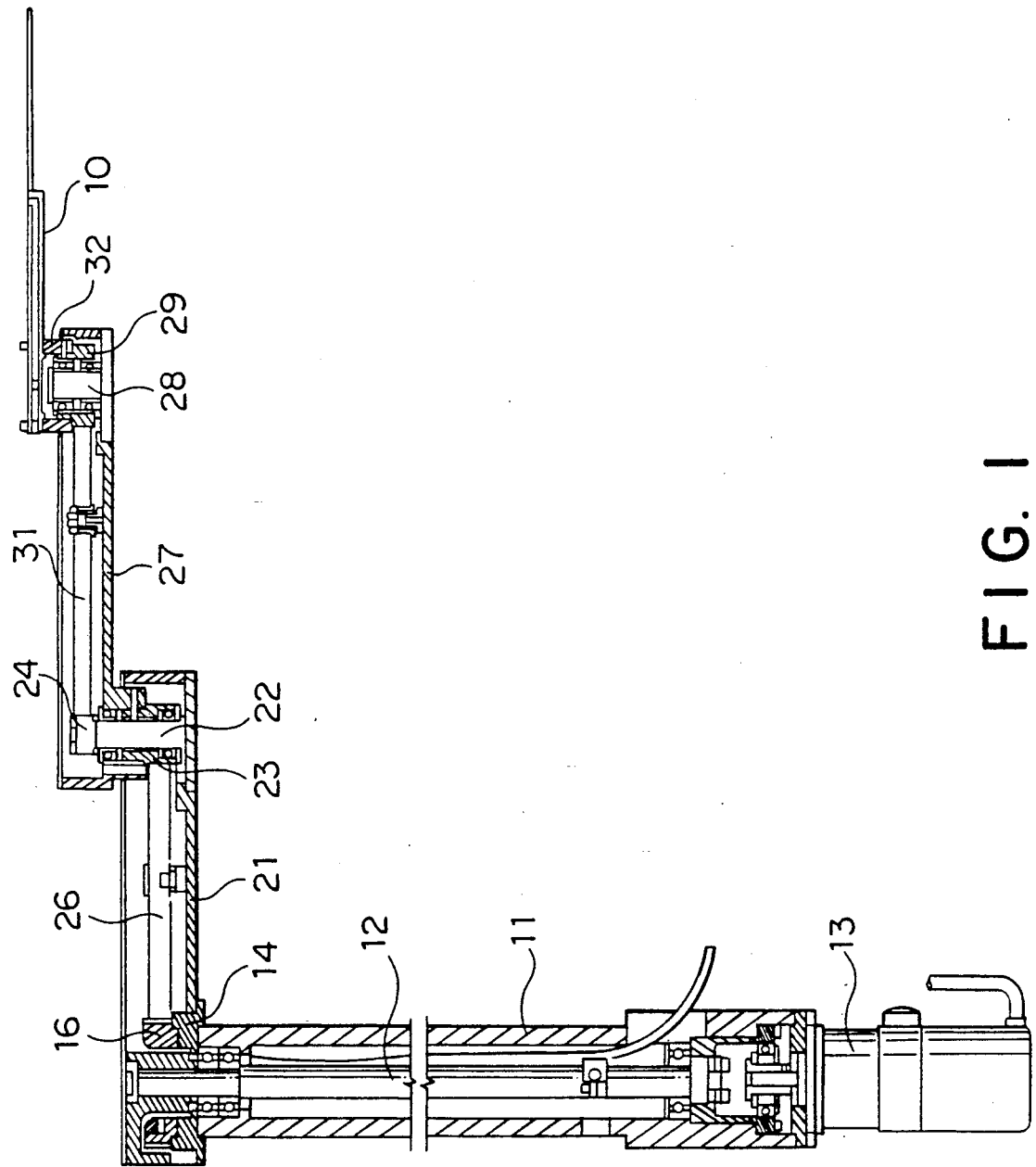
FIG. 1 shows a sectional view of a main part of a robot arm according to a preferred embodiment of this invention.
Figure 2:
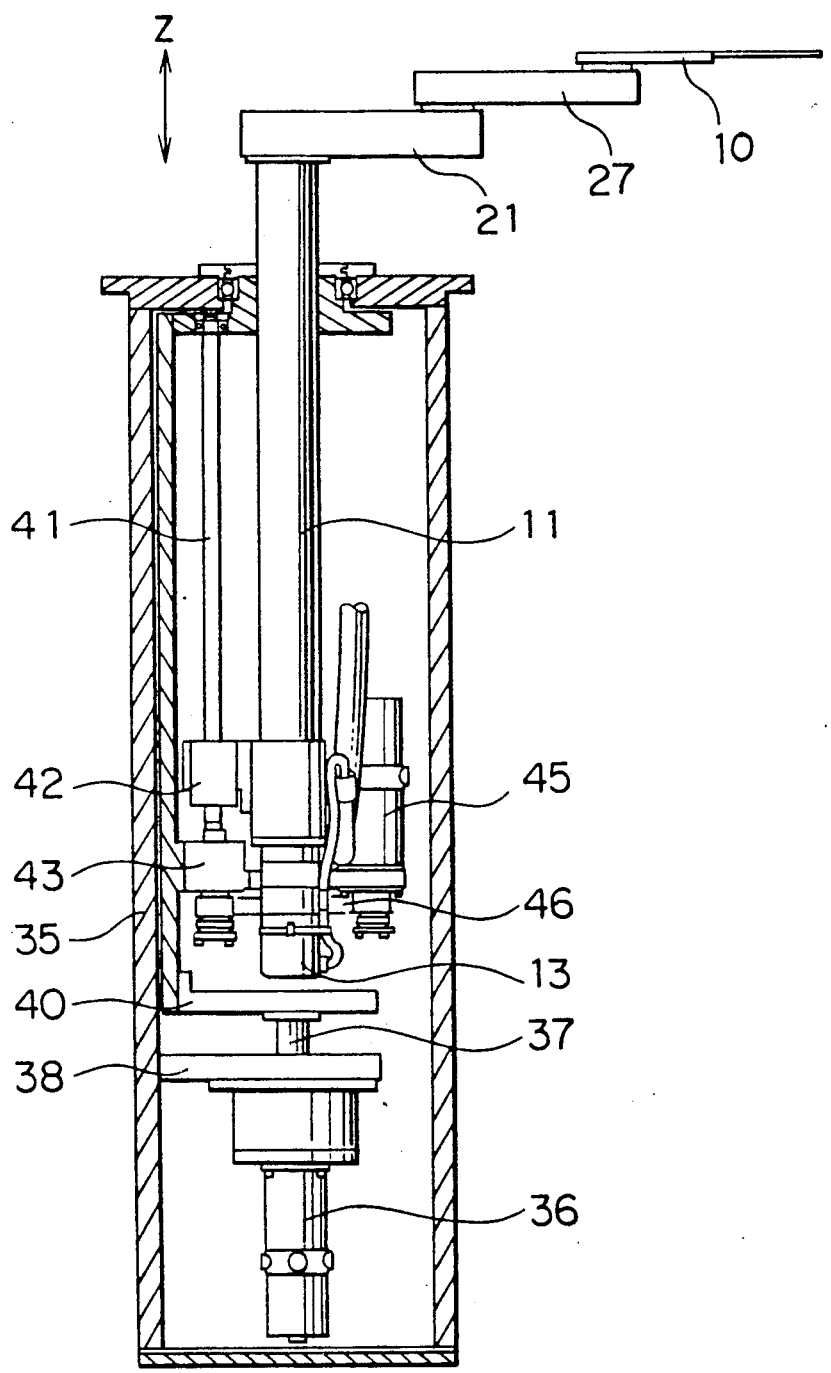
FIG. 2 shows an entire elevational view of the robot arm which is illustrated in FIG. 1 and which is partially sectioned.
Figure 3:
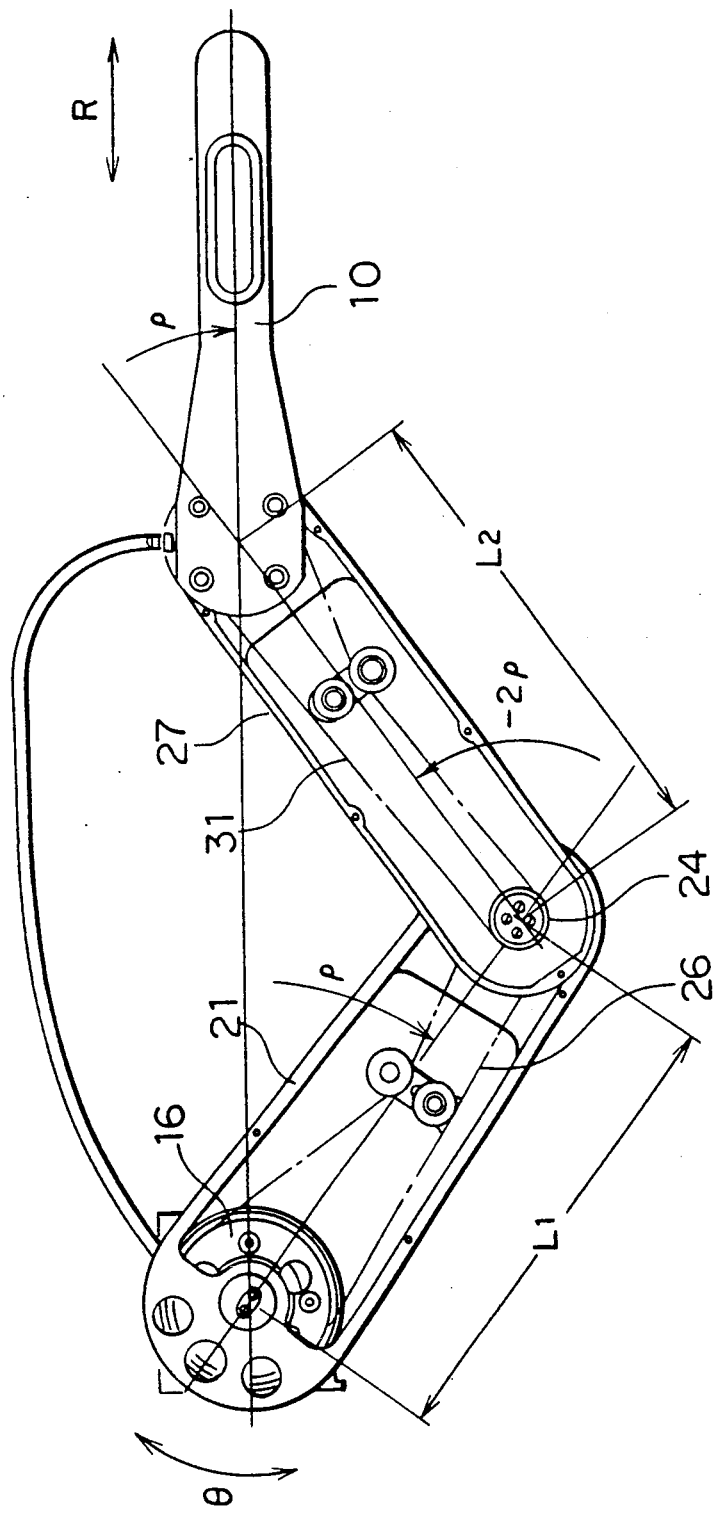
FIG. 3 a plan view of the robot arm illustrated in FIGS. 1 and 2.

Referring to FIGS. 1 through 3, a robot arm according to a preferred embodiment of this invention comprises a chuck arm unit 10 operable to convey an article (not shown), such as a semiconductor wafer, from one station to another within a processing apparatus (also not shown), a main post 11 having a hollow space therein, an upper end, and a lower end and a driving or rotatable axle 12 which stands upright within the hollow space, as shown in FIG. 1 and which has a first end and a second end adjacent to the upper and the lower ends of the main post 11. Briefly, the illustrated robot arm serves to convey rotary motion of the rotatable axle 12 into linear motion and to carry out elevation motion of the main post 11 upwards and downwards of FIGS. 1 and 2.

An arm retraction motor 13 is jointed to the second end of the driving axle 12 to expand or retract the robot arm along a horizontal direction and, as a result, to convert the rotary motion into the linear motion when the arm retraction motor 13 is driven. In FIG. 1, a stopper ring 14 is fixedly covered on the main post 11 with the first end of the driving axle 12 protruded through the stopper ring 14, as shown in FIG. 1. A first gear 16 is integral with or fixed to the stopper ring 14, with a gear surface of the first gear 16 directed outside of the main post 16. The first gear 16 has a first predetermined number of teeth on the gear surface. The first predetermined number may be, for example, 72.

In FIG. 1, a first arm unit 21 has an inner end rotatably supported around the stopper ring 14, an outer end movable around the main post 11, and a preselected height for defining an inner space in the first arm unit 21. It is to be noted that the inner end of the first arm unit 21 is fixed to the first end of the driving axle 12. At the outer end of the first arm unit 21, a first fixed axle 22 is fixed to a bottom surface of the first arm unit 21 and stands upright on the first arm unit 21. As illustrated in FIG. 1, the first fixed axle 22 is partially projected from the first arm unit 21. In the example being illustrated, it is assumed that a distance between center axes of the driving axle 12 and the first fixed axle 22 is equal to L1. In addition, a second gear 23 is rotatably supported around the first fixed axle 22 and is located within the inner space of the first arm unit 21. The second gear 23 has a second predetermined number of teeth which may be, for example, 36. At any rate, it is to be noted that a first gear ratio of the first to the second gears 16 to 23 is equal to 2:1. Furthermore, a third gear 24 is fixedly mounted on a projected portion of the first fixed axle 22 and has the number of teeth equal, for example, to 24. In other words, the third gear 24 is integral with the first fixed axle 22.

As shown in FIGS. 1 through 3, the first and the second gears 16 and 22 are associated with each other through a first power transmission element 26 which may be, for example, a toothed belt engaged with the first and the second gears 16 and 22. In the illustrated example, a pair of guide rollers (unnumbered) is placed between the first and the second gears 16 and 22.

In FIG. 1, a second arm unit 27 is fixed to the second gear 23 and can therefore be pivoted together with the second gear 23. More specifically, the second arm unit 27 has an inside end fixed to the second gear 23 and an outside end spaced apart from the inside end. A second fixed axle 28 is fixed to the outside end of the second arm unit 27 and stands upright from a bottom surface of the second arm unit 27. The second fixed axle 28 has a center axis. Let a distance between the center axes of the first and the second axles 22 and 28 be equal to L2. To the second fixed axle 28, a fourth gear 29 is rotatably fitted within the second arm unit 27 and has a third predetermined number of teeth which may be equal, for example, to 48. In any event, the third predetermined number is equal to twice the number of the teeth of the third gear 24. This shows that a second gear ratio of the third to the fourth gears 24 and 29 in equal to 1:2. The third and the fourth gears 24 and 29 are associated with each other by a second power transmission device 31 which may be a toothed belt, as illustrated in FIG. 1. In addition, a retainer 32 and the chuck arm 10 are fixed to the fourth gear 29.

The main post 11 illustrated in FIG. 1 is accommodated within a housing 35 together with the arm retraction motor 13, as illustrated in FIG. 2. A post rotating motor 36 is located at a lower portion of the housing 35 and serves to rotate the main post 11 in a manner to be described. The post rotating motor 36 has an output axis 37 directed upwards of FIG. 2 and is fixed to the housing 35 through a bracket 38. The output axis 37 of the post rotating motor 36 is fixed to a frame 40 which is rotatably supported on an inner wall of the housing 35. Specifically, the frame 40 has a horizontal portion horizontally extended, a vertical portion connected to the horizontal portion and vertically extended from the horizontal portion, and an upper portion rotatably fitted to a cap portion of the housing 35. The main post 11 is fastened to the upper portion of the frame 40. With this structure, the main post 11 is rotated with rotation of the post rotating motor 36 and, as a result, a combination of the first arm unit 21, the second arm unit 27, and the chuck arm 10 can be pivoted around the main post 11 and may be called an arm number.

Furthermore, the main post 11 is mechanically coupled to the frame 40 through a ball screw 41 and a support bracket 42. More particularly, the support bracket 42 is jointed to the main post 11 while the ball screw 41 is threaded through the support bracket 42 and a support stud 43 and extended downwards of the support stud 43. The support stud 43 is fastened to the vertical portion of the frame 40 and laid around the main post 11. On a righthand side of the support stud 43, a post elevating motor 45 is supported, as shown in FIG. 2, and has an output axis extended downwards of FIG. 2 through the support stud 43. The output axis of the post elevating motor 45 is coupled to the ball screw 41 through a belt 46. With this structure, the main post 11 can be elevated upwards of FIG. 2 or lowered downwards by driving the post elevating motor 45 and by rotating the belt 46 to rotate the ball screw 41.

Let an operation of the robot arm illustrated in FIGS. 1 through 3 be described for a better understanding of this invention.

At first, the post rotating motor 36 shown in FIG. 2 is assumed to be driven by a power source (not shown) and to be rotated by a rotation angle $\theta$. The rotation of the post rotating motor 36 results in rotation of the frame 40 jointed to the main post 11. Consequently, the main post 11 is rotated by the rotation angle $\theta$, as illustrated in FIG. 3, together with the arm member composed of the first arm unit 21, the second arm unit 27, and the chuck arm 10. Thus, the arm member can be rotated by driving the post rotating motor 36.

On the other hand, let the post elevating motor 45 be driven by the power source. In this event, the ball screw 41 is rotated via the belt 46. Inasmuch as the ball screw 41 is mechanically coupled to the main post 11 through the support bracket 42, the main post 11 is elevated or lowered along with the support bracket 42 which is elevated or lowered by rotation of the ball screw 41. As a result, the arm member is moved upwards or downwards of FIG. 2, as depicted at an arrow Z.

Furthermore, when the arm retraction motor (FIGS. 1 and 2) 13 is driven or rotated clockwise or counterclockwise, the driving axle 12 (FIG. 2) is also rotated clockwise or counterclockwise. Inasmuch as the driving axle 12 is integral with or fixed to the first arm unit 21, as mentioned before, the first arm unit 21 is rotated relative to the main post 12 clockwise or counterclockwise. Herein, let the driving axle 12 be rotated clockwise by an angle $p$. In this case, the first arm unit 21 is also rotated or pivoted by the angle $p$ clockwise, as illustrated in FIG. 3. From this fact, it is understood that the rotation of the first arm unit 21 brings about relative rotation of the first gear 16 fixed to the main post 11. Specifically, the first gear 16 is rotated in a reverse sense relative to the rotation of the first arm unit 21. In the above-mentioned example, the first gear 16 is rotated counterclockwise by the angle $p$. Therefore, the rotation angle of the first gear 16 is represented by $-p$. Since the first gear 16 is associated with the second gear 23 via the toothed belt 26, the relative rotation of the first gear 16 is transmitted to the second gear 23 and rotates the second gear 23.

It is to be recollected that the gear ratio of the first gear to the second gear is equal to 2 : 1. In this situation, the second gear 23 is rotated in the same sense as the first gear 16 by $-2\rho$. Inasmuch as the second arm unit 27 is fixed to the second gear 23, as mentioned before, the second arm unit 27 is rotated counterclockwise by $2\rho$, namely, rotated by $-2\rho$, as illustrated in FIG. 3.

Herein, it is noted that the third gear 24 is fixed to the second fixed axle 22 fastened to the first arm unit 21 and is mechanically coupled to the fourth gear 29 through the second toothed belt 31 that the distance L1 is equal to the distance L2. Under the circumstances, the rotation of the second arm unit 27 brings about relatively reverse rotation of the third gear 24. Accordingly, the third gear 24 is rotated by $2\rho$ relative to the second arm unit 27 in the above-mentioned example. Such relative rotation of the third gear 24 is transmitted via the second toothed belt 31 to the fourth gear 29 and brings about rotation of the fourth gear 29 in the same sense as the third gear 24. Since the second gear ratio of the third gear to the fourth gear is equal to 1:2, the fourth gear 29 is rotated by $\rho$ clockwise, as shown in FIG. 3. As a result, the chuck arm 10 is also rotated by the same angle as the fourth gear 29.

This shows that the first arm unit 21 and the chuck arm 10 are always rotated in the same sense by the same angle. Therefore, the chuck arm 10 is moved with an invariable sense directed when the arm retraction motor 13 is driven. In other words, the chuck arm 10 is moved in a radial direction depicted at an arrow R. Thus, it is possible to convert rotary motion of the arm retraction motor 13 into the linear motion of the chuck arm 10 and, as a result, to realize radial or linear motion of the robot arm.

While this invention has thus far been described in conjunction with a preferred embodiment thereof, it will readily be possible for those skilled in the art to put this invention into practice in various other manners.

What is claimed is:

1. A robot arm comprising:
a main post which has a hollow space therein, an upper end, and a lower end;
a rotatable axle which has first and second ends adjacent to said upper and said lower ends of said main post, respectively, and which is extended along said main post within said hollow space;
a first motor coupled to said second end of the rotatable axle and adjacent to said lower end of the main post for rotating said rotatable axle;
a first gear which has a first predetermined number of teeth and which is fixed to said first end of the main post;
a first arm unit which has an inner and an outer end and which is fixed to the inner end of said first axle to be extended from said first end of the first axle;
a first fixed axle which is fixed to said outer end of the first arm unit and which stands upright from said outer end of the first arm unit;
a second gear which has a second predetermined number of teeth and which is rotatably supported on said first fixed axle;
a first power transmission element coupled to said first and said second gears;
a second arm unit which has first and second end portions adjacent to and farther from said first arm unit, respectively, and which is fixed to said second gear at said first end portion to be substantially horizontally extended from said first end portion;
a third gear which has the second predetermined number of teeth and which is fixed to said first fixed axle with said third gear placed within said second arm unit;
a second fixed axle which is fixed to said second end portion of the second arm unit and which stands upright from said second end portion of the second arm unit;
a fourth gear which has a third predetermined number of teeth and which is rotatably supported on said second fixed axle with said fourth gear located within said second arm unit;
a second power transmission element coupled to said third and said fourth gears;
a chuck arm which is fixed to said fourth gear and which is substantially horizontally extended from said second arm unit;
a housing for accommodating said main post along with said first motor;
a second motor which has an output axis and which is fixed to an inside wall of said housing;
a frame member placed within said housing and connected to said output axis of the second motor for rotating said main port; and
an elevating member fixed to said frame member and said main post for selectively moving said main post downwards and upwards.

2. A robot arm as claimed in claim 1, wherein a first gear ratio of said first gear to said second gear and a second gear ratio of said second gear to said fourth gear are selected so that rotary motion of said rotatable axle is converted into linear motion of said chuck arm.

3. A robot arm as claimed in claim 2, said first gear ratio and said second gear ratio are equal to 2:1 and 1:2, respectively.

4. A robot arm as claimed in claim 3, wherein a first distance between said rotatable axle and said first fixed axle is equal to a second distance between said first fixed axle and said second fixed axle.

5. A robot arm as claimed in claim 1, wherein said elevating member comprises:
a support stud fixed to said frame member;
a ball screw rotatably supported to said support stud and said frame member and extended along said main post;
rotating means coupled to said ball screw for rotating said ball screw; and
a bracket fixed to said main post and rotatably supported on said ball screw for selectively moving said main post upwards and downwards when said ball screw is rotated by said rotating means.

6. A robot arm as claimed in claim 1, wherein each of said first and said second power transmission elements is formed by a toothed belt.

* * * * *